US006847960B1

(12) United States Patent
Li et al.

(10) Patent No.: US 6,847,960 B1
(45) Date of Patent: Jan. 25, 2005

(54) DOCUMENT RETRIEVAL BY INFORMATION UNIT

(75) Inventors: Wen-Syan Li, Fremont, CA (US); K. Selcuk Candan, Scottsdale, AZ (US); Yi-Leh Wu, Goleta, CA (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/461,561

(22) Filed: Dec. 14, 1999

Related U.S. Application Data (60) Provisional application No. 60/126,949, filed on Mar. 29, 1999.

(51) Int. Cl.[7] .............................................. G06F 17/00
(52) U.S. Cl. ........................................................ 707/3
(58) Field of Search ........................... 707/5, 100, 102, 707/104.1; 704/3

(56) References Cited

U.S. PATENT DOCUMENTS

| | | | | |
|---|---|---|---|---|
| 5,835,905 A | * | 11/1998 | Pirolli et al. | 707/3 |
| 5,855,015 A | * | 12/1998 | Shoham | 707/5 |
| 5,875,423 A | * | 2/1999 | Matsuoka | 704/220 |
| 5,878,423 A | * | 3/1999 | Anderson et al. | 707/100 |
| 5,913,215 A | * | 6/1999 | Rubinstein et al. | 707/10 |
| 5,983,221 A | * | 11/1999 | Christy | 707/5 |
| 5,987,454 A | * | 11/1999 | Hobbs | 707/4 |
| 6,085,186 A | * | 7/2000 | Christianson et al. | 707/3 |
| 6,092,074 A | * | 7/2000 | Rodkin et al. | 707/102 |
| 6,094,649 A | * | 7/2000 | Bowen et al. | 707/3 |
| 6,253,198 B1 | * | 6/2001 | Perkins | 707/3 |
| 6,421,675 B1 | * | 7/2002 | Ryan et al. | 707/100 |

OTHER PUBLICATIONS

Kleinberg, Jon M., "Authoritative Sources in a Hyperlinked Environment", In *Proceedings of the 9th ACM–SIAM Symposium on Discrete Algorithms*, 1998.

Mukherjea, Sougata et al., "Focus+Context Views of World-–Wide Web Nodes," In *Proceedings of the 1997 ACM Hypertext '97 Conference*, pp. 187–196, Southampton, UK, Mar. 1997.

NEC Corporation, "JTOPIC Developer's Kit", NEC Corporation, Dec. 1997.

Brin, Sergey, et al., "The Anatomy of a Large–Scale Hypertextual Web Search Engine," In *Proceedings of the 7th World–Wide Web Conference*, Brisbane, Queensland, Australia, Apr., 1998.

Suciu, Dan, "Semistructured Data and XML," In *Proceedings of 5th International Conference of Foundations of Data Organization (FODO '98)*, Kobe, Japan, Nov. 1998.

Tajima, Keishi, et al., "Cut as a Querying Unit for WWW, Netnews, E–mail," In *Proceedings of the 1998 ACM Hypertext Conference*, pp. 235–244, Pittsburgh, PA, Jun. 1998.

(List continued on next page.)

*Primary Examiner*—Safet Metjahic
*Assistant Examiner*—Sana Al-Hashemi
(74) *Attorney, Agent, or Firm*—Sughrue Mion, PLLC (57) ABSTRACT

A method of searching a search space comprising a plurality of pages in response to a query comprising a plurality of keywords includes identifying at least one information unit. Where a query includes exactly two keywords, an information unit comprises one page which contains both keywords in the query or two pages selected from the search space such that the first page in the information unit contains the first keyword in the query and the second page in the information unit contains the second keyword in the query; where an information unit contains two pages, one page is linked, directly or indirectly, to the other page. Relaxed query processing techniques enable the method to identify information units which do not contain every keyword in the query, which have only semantically similar words or synonyms, and which have keywords of differing relative importance. The method is adapted to report the identified information units and to accommodate altered queries provided as a result of a report.

45 Claims, 5 Drawing Sheets

OTHER PUBLICATIONS

Li, Wen–Syan, et al., "Facilitating Complex Web Queries Through Visual User Interfaces and Query Relaxation," *Computer Networks and ISDN Systems*, 30 (1998), pp. 149–159.

Bharat, Krishna, et al., "Improved Algorithms for Topic Distillation in a Hyperlinked Environment"; In *Proceedings of the 21st Annual International ACM SIGIR Conference*, pp. 104–111, Melbourne, Australia, Aug. 1998.

Chakrabarti, Soumen, et al. "Automatic Resource Compilation by Analyzing Hyperlink Structure and Associated Text," In *Proceedings of the 7th World–Wide Web Conference*, pp. 65–74, Brisbane, Queensland, Australia, Apr. 1998.

Cho, Junghoo, et al. "Efficient Crawling Through URL Ordering," *Computer Networks and ISDN Systems*, Special Issue on the Seventh International World–Wide Web Conference, Brisbane, Australia, 30(1–7), Apr. 1998.

Dar, Shaul, et al., "DTL's DataSpot: Database Exploration Using Plain Language," In *Proceedings of the 24th International Conference on Very Large Data Bases*, pp. 645–649, New York City, New York, Aug. 1998.

EGroups, http://www.egroups.com/list/dbword/.

Gibson, David, et al., "Clustering Categorical Data: An Approach Based on Dynamic Systems," In *Proceedings of the 24th International Conference on Vary Large Data Bases*, Sep. 1998.

Gibson, David et al., "Inferring Web Communities from Link Topology," In *Proceedings of the 1998 ACM Hypertext Conference*, pp. 225–234, Pittsburgh, PA, Jun. 1998.

Goldman, Roy, et al., "Proximity Search in Databases," In *Proceedings of the 24th International Conference on Very Large Data Bases*, pp. 26–37, New York City, New York, Aug. 1998.

C.D. Bateman et al. "Provably Good Routing Tree Construction with Multi–port Terminals"; In proceedings of the ACM/SIGDA International Symposium on Physical Design, Apr. 1997.

S.L. Hakimi "Steiner's Problem in Graphs and its Implications" Networks, 1:113–133, 1971.

E. Ihler "Bounds on the Quality of Approximate Solutions to the Group Steiner Tree Problem", reprinted from proceedings of the 16th International Workshop on Graph Theoretic Concepts in Computer Science; Lecture Notes in Computer Science, pp. 109–118, 1991.

G. Reich et al., "Beyond Steiner's Problem: A VLSI Oriented Generalization", In proceedings of the 15th International Workshop on Graph Theoretic Concepts in Computer Science WG8, Lecture Notes in Computer Science, pp. 196–210, 1990.

W. Bruce Croft et al., "Providing Government Information on the Internet: Experiences with THOMAS", In proceedings of Digital Libraries (DL '95), 1995.

N. Garg et al., "A Polylogarithmic Approximation Algorithm for the Group Steiner Tree Problem", In proceedings of the 9th Annual ACM–SIAM Symposium on Discrete Algorithms, pp. 253–259, 1998.

Frank K. Hwang et al., "The Steiner Tree Problem", Annals of Discrete Mathematics, vol. 53, 1992 (Table of Contents).

Wen–Syan Li et al., "PowerBookmarks: A System for Personalizable Web Information Organization, Sharing, and Management", In proceedings of the 8th World–Wide Web Conference, Toronto, Canada, May 1999.

R. Richardson et al., "Using WordNet as a Knowledge Base for Measuring Semantic Similarity Between Words", In proceedings of Artificial Intelligence and Cognitive Science Conference.

Petr Slavik, "The Errand Scheduling Problem", Mar. 14, 1997.

* cited by examiner

```
01 MODULE TwoKeywordEquiCostIU;
02 BEGIN
03    /* Initialization */
04    Let $[R_1]^0 = [R_1]$;
05    Let $[R_2]^0 = [R_2]$;
06    $N = 0$;
07    $Solution = \phi$;
08    WHILE (|Solution| < k) DO
09       $N = N + 1$;
10       /* Compute the N-closure of all the pages in $[R_1]$ and $[R_2]$ by using $N-1$-closure */
11       $[R_1]^N$ is computed from $[R_1]^{N-1}$ and the edges incident on vertices in $[R_1]^{N-1}$;
12       $[R_2]^N$ is computed from $[R_2]^{N-1}$ and the edges incident on vertices in $[R_2]^{N-1}$;
13       /* Determine the new information units in the N-closure but not in Solution */
14       FOR $i = 0$ TO $N$ DO
15          FOR each $v \in ([R_1]^i \cap [R_2]^{N-i})$ DO
16             FOR a path $s = \{v_a, \ldots, v, \ldots, v_b\}$ in the graph $[R_1]^i \cup [R_2]^{N-i} \bigwedge s \notin Solution$ DO
17                Output $s$;
18                $Solution = Solution + \{v_a, \ldots, v_b\}$;
19                IF |Solution| > k THEN EXIT; END;
20             END; (* FOR *)
21          END; (* FOR *)
22       END; (* FOR *)
23    END; (* WHILE *)
24 END.
```

DOCUMENT RETRIEVAL BY INFORMATION UNIT

This application claims the benefit of U.S. Provisional Application No. 60/126,949, filed Mar. 29, 1999. This application is also related to application, Ser. No. 09/184,759, filed Nov. 2, 1998, entitled "Advanced Web Bookmark Database System", now U.S. Pat. No. 6,275,227, issued Apr. 20, 2004. This application is also related to another application, Ser. No. 09/273,808, filed Mar. 22, 1999 entitled "System For Personalizing, Organizing And Managing Web Information", now U.S. Pat. No. 6,631,496, issued Oct. 7, 2003. The disclosures of all of these applications are hereby incorporated by reference.

BACKGROUND OF THE INVENTION

1. Field of the Invention

This invention relates generally to a method of processing queries, and more particularly to a method of identifying one or more information units in response to a multiple keyword query of a search space.

2. Description of the Related Art

Since the structure of the World Wide Web (the Web) encourages hypertext and hypermedia document authoring (e.g. HTML and XML), Web authors tend to create documents which are composed of multiple pages which are connected via links. A Web document or XML database record may be authored in multiple ways. For example, a document or record may have all of its information contained on a single physical page, or, more commonly, the document may be segmented into multiple parts such as a main page and one or more separate pages containing related information which are linked to the main page. Each of the related pages may, likewise, contain links to additional related pages. In response to keyword queries of the internet or database search spaces, existing search engines return only those physical pages which contain all of the keywords in a given query. Focusing the search upon individual pages in the search space, however, is a significant shortcoming which causes conventional search engines to return deficient results in response to queries comprising a plurality of keywords.

For example, in an attempt to locate the internet sites which feature announcements for recent or upcoming conferences or conventions related to the Web, a user may issue a query which contains, say, three keywords: "web"; "conference"; and "topic". A typical internet search engine which is issued such a multiple keyword query reports results which are surprisingly inaccurate, omitting many of the most relevant Web sites. The primary reason for such inaccurate reporting ("false drops") is that the contents of the HTML documents which make up the Web are often distributed among multiple physical pages, and conventional internet search engines do not take this document structure into account when conducting the search. In accordance with the present state of the art related to Web indexing and searching technology, existing search engines retrieve only those individual pages which contain each and every keyword in the query.

The output of a conventional search engine is a list of individual physical pages which satisfy the query by containing all of the requested keywords. If an individual page on the Web or in an XML database does not contain complete information (i.e., all the keywords) for answering the query, however, the page is generally not reported by the search engine. The deficient page is "dropped" even though the document of which that page is a part may be very relevant when all of its various linked pages are viewed as a whole.

Some current search engines provide for what is known as query relaxation. For example, the search engine may be instructed to identify and to report, on the one hand, pages which contain less than all of the keywords in the query, or, on the other hand, pages which contain words which are only similar to keywords in the query, rather than exact matches. Typically, if such pages are reported by the search engine in response to a relaxed query, they are generally assigned a lower "rank" or "relevance" than pages which fully satisfy the query. Such a rank may be assigned according to the number of missing or merely similar words in the page, or according to the degree of similarity between the existing word and the missing keyword. Even in the case of the most sophisticated search engines presently employing query relaxation options, however, the search is conducted only for individual physical pages in the search space. No consideration is given to the content of the neighboring pages to which the searched page is linked. By limiting the nature of the search to individual pages rather than considering the structure of the documents searched and the relationships between linked pages, the typical search engine misses many relevant pages, especially in a relaxed query situation where associations between pages and their relative proximity can be very important in the determination of relevance short of a perfect solution to the query.

Also, in many cases, search engines are adapted to accommodate altered queries in the form of elimination, addition, or substitution of keywords in a subsequent search of differing scope. An altered query can direct the search engine to identify, on the one hand, more pages where the original search proved uninformative, or, on the other hand, fewer pages where the original search returned an overwhelming amount of information. Such a dynamic process of altering the keywords in the query responsive to the reported results of the original query is an important feature which should be incorporated into every search engine, since this facilitates refining the search and consequently identifying the most useful information in the search space.

As the Web becomes larger and its use becomes even more prevalent than it is today, the search engine chosen for any given search will be required to sort through correspondingly more information. Consequently, efficiency and minimization of inaccurate responses in Web searches will increase in importance, if the searches are to retain any utility at all. Those searching the internet want the search engine to report the most relevant results with little or no extraneous information. Taking into account the structure of the search space, the search engine should minimize unwarranted or false drops of legitimately relevant material by distinguishing pages, as well as combinations of linked pages, which are truly relevant from those pages which should rightfully be dropped as less relevant.

An effective search engine can recognize that one page which does not contain every keyword in a particular query, but which is linked to other pages which contain other keywords, may still be relevant in combination with the pages to which it is linked. Such a situation is common given the nature of the internet, XML databases, and the structure of their documents. The combined set of pages should be identified as a relevant information unit, but such combinations of pages are not considered by existing search engines which only examine the contents of individual pages and ignore the relationships between pages.

There has been a continuing and growing need, therefore, for a method of processing keyword queries of vast search spaces, such as the Web or an XML database, which takes into account the way in which the information within those search spaces is authored and arranged. Consideration of the structure of HTML and XML documents, as well as the interrelationship between their pages, is crucial with respect to accurate and efficient information retrieval in large, computer-based search spaces.

SUMMARY OF THE INVENTION

The method of query processing of the present invention addresses the above-mentioned considerations and overcomes these and other shortcomings of conventional search techniques by providing a method of identifying information units in response to keyword queries of a search space. Additionally, the method of the present invention satisfies the requirements for an efficient search technique by defining a progressive query processing method of identifying information units without a need for pre-computation or prior knowledge of the entire search space. In particular, the method is adapted to conduct a search of a search space responsive to a two keyword query.

Given a search space comprising a set of documents made up of pages (hypertext or hypermedia documents, for example, such as HTML or XML documents), wherein each page in the search space may be linked via one or more links to other pages in the search space (for example, as in the Web), the present invention introduces the concept of an information unit, which can be viewed as a single, logical document comprising a set of one or more physical pages which are linked together, either directly or indirectly through one or more intervening pages. Each of the pages in the information unit contains at least one of the keywords in the query.

Essential aspects of the present invention relate to considerations which are fundamental to information retrieval within a search space, namely: those utilizing search engines generally are not merely interested in a single result, but rather a plurality of results, all of which are relevant; while generating a particular result, it is beneficial for a method of query processing to reuse existing results in order to expedite the search and to allocate system resources efficiently; and, given a very large search space, pre-processing procedures and any computations which require touching or enumerating all pages within the search space are not feasible. The present method addresses all of these aspects of information retrieval and employs a novel querying strategy to identify a plurality of relevant information units.

The method of the present invention requires the preliminary step of conducting an initial search, in response to an issued keyword query, to locate the pages within the search space which contain at least one of the two keywords in the query. The links associated with the pages containing keywords are then examined such that a desired number of information units can be identified. Each individual page which contains both keywords is identified as an independent information unit. In addition, the search method identifies pairs of pages related via link which collectively contain both keywords in the issued query. Each pair of related pages is likewise identified as an independent information unit. The method of the present invention is adapted to output results such that the identified information units can be reported or listed in much the same way as conventional search engines report a list of pages responsive to a query.

The present invention utilizes iterative procedures such that a plurality of information units, if a plurality exists, can be identified in response to any given query. Most computer users expect such multiple solutions to a particular query to be ranked according to relevance; the present method generally seeks to identify the most relevant information units first such that the information units are identified in order of decreasing relevance. The information units can be reported accordingly.

With respect to determining the relevance of a particular combination of pages, according to one preferred embodiment, the links which connect adjacent pages in the search space are each assigned a cost. The cost assigned to a particular link may be a function of the content of the pages connected by the link. For example, if two adjacent pages each contain a keyword in the query, the cost assigned to the link which connects them may be minimal, whereas if one page contains a keyword and the other page does not, the cost assigned to the link connecting them may be relatively great. The relative proximity of the pages within the search space, as measured, for example, by their locations on the internet or within a given database, may be a factor in the assigned cost of the link between those pages. The assignment of a cost to each link connecting pages in the search space enables the method of the present invention to identify the most relevant information unit (the information unit having pages which are connected by the links with the lowest costs) first, with subsequent information units being identified in order of decreasing relevance.

Another important feature of the invention is the way in which it provides a method of performing progressive query processing without knowing and searching the whole search space in order to identify the most relevant information units. Because the present method examines links associated with pages found to contain keywords, the area to be searched can be limited to the immediate vicinity of those pages. The search is based upon local information and the associations between close neighbors in the search space—knowledge of the structure and organization of the entire search space is not required for efficient and accurate searching.

The method of the present invention accommodates relaxed querying, wherein each keyword in the query need not be present in the pages of the information unit in order for a given pair of pages to be deemed relevant. The present invention also takes into consideration the likelihood that the original query may provide inadequate results. An altered query allows the scope or nature of the search to be modified in response to unsatisfactory results of the original query.

BRIEF DESCRIPTION OF THE DRAWINGS

The above-mentioned and other advantages of the present invention will become more apparent upon a detailed examination of the preferred embodiments thereof with reference to the attached drawings in which.

DETAILED DESCRIPTION OF A PREFERRED EMBODIMENT

Figure 1:
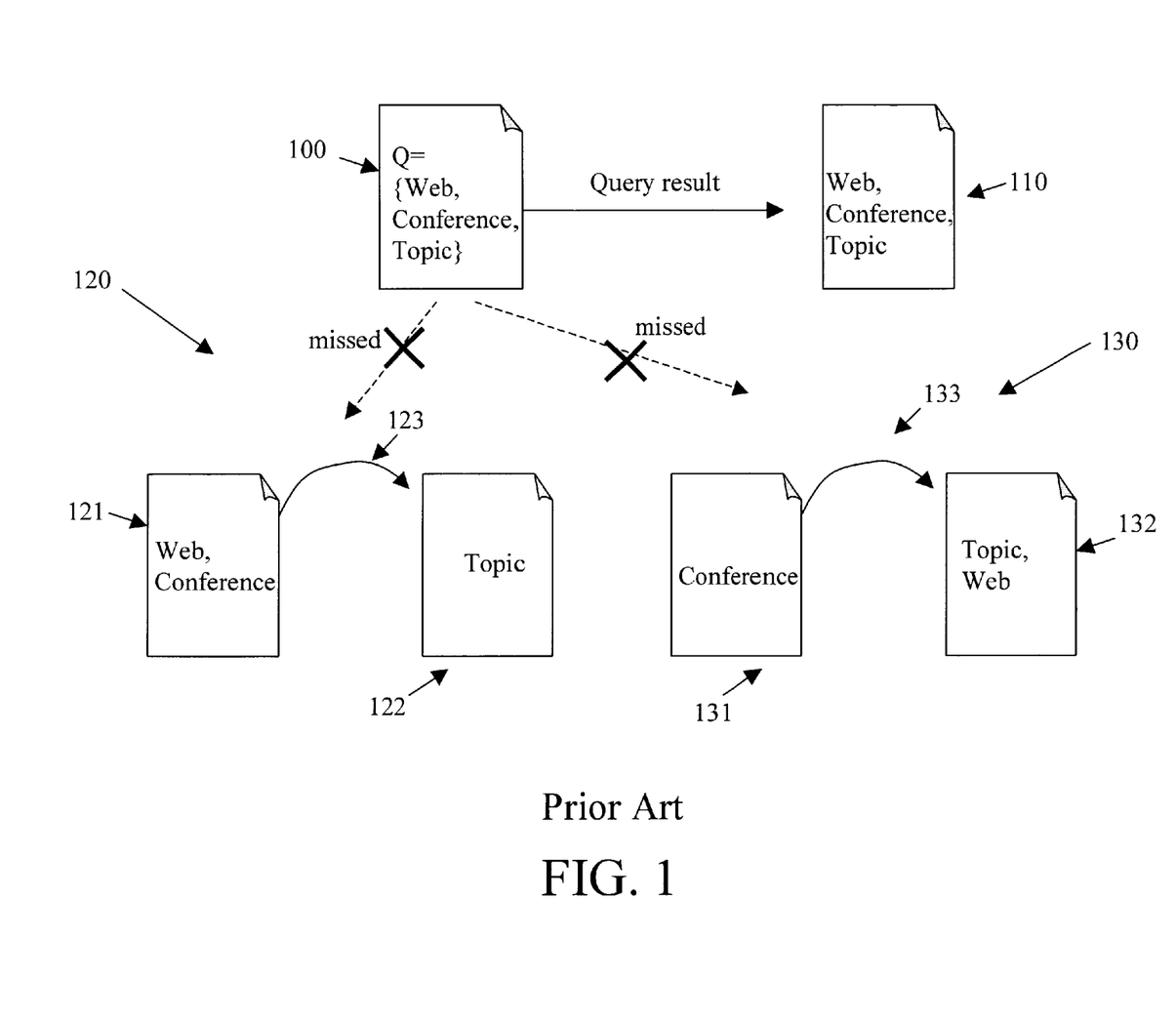
FIG. 1 illustrates the shortcomings of the typical prior art search engine which is issued a three keyword query comprising the keywords "web," "conference," and "topic."

Turning now to the drawings, FIG. 1 illustrates some of the shortcomings of the typical prior art search engine which are overcome by the present invention. In FIG. 1, a conventional search engine has been issued a three keyword query, as shown in the page represented at 100. The search space in this example is the World Wide Web, and the query comprises the three words "Web," "Conference," and "Topic." The results of the query, or "answers" reported by the search engine, are generally reported in the form of a list of individual pages which contain all three keywords; page 110, for example, which contains all three keywords, would be identified as a valid result of the query. A list of results is typically displayed on a display device.

Of particular interest in FIG. 1 are the sets of pages 120 and 130 which were missed, or "dropped," by the search engine. As noted in the representations of pages 121 and 122, page 121 contains the keywords "Web" and "Conference," while page 122 contains the keyword "Topic." The direct link between pages 121 and 122 is represented by the arrow 123. Similarly, page 131 contains the keyword "Conference," while page 132 contains the keywords "Topic" and "Web." The direct link between pages 131 and 132 is represented by the arrow 133. Both sets of pages 120 and 130 are highly relevant potential answers to the query, but since the keywords are distributed across more than one physical page within the same document, each individual page 121, 122, 131, and 132 is deficient and therefore ignored by the search engine.

The search engine conducting the search illustrated in FIG. 1 fails to take into account the basic structure of the World Wide Web; Web sites are generally constructed of a plurality of pages, each linked together such that navigation from page to page is possible. While a particular Web site may contain a great deal of information, that information may be distributed among several or many individual physical pages, each having a discrete Universal Resource Locator (URL) associated therewith for identification and location purposes.

By way of illustrating the structure and arrangement discussed above, FIG. 2 shows part of a search space, such as the World Wide Web or an XML database. The search space comprises a plurality of physical pages, denoted as reference numerals 201–210. Each page 201–210 within the search space may be related to one or more of the other pages 201–210 via one or more links, which are denoted by the arrows in FIG. 2. For example, page 202 is directly linked to page 204 and also to page 205 as indicated by the arrows 220 and 230, respectively, in FIG. 2. These links are described as "direct" due to the lack of any intervening pages between page 202 and page 204, or between page 202 and page 205. An indirect link, on the other hand, describes a connection between pages wherein at least one additional page is required to make the connection between the indirectly linked pages. For example, as noted above, page 202 is directly linked by link 230 to page 205. Likewise, page 205 is directly linked to page 210 through the link represented by arrow 240. Pages 202 and 210 are, therefore, linked indirectly through page 205, which can be described as an intervening page in this context.

Figure 2:
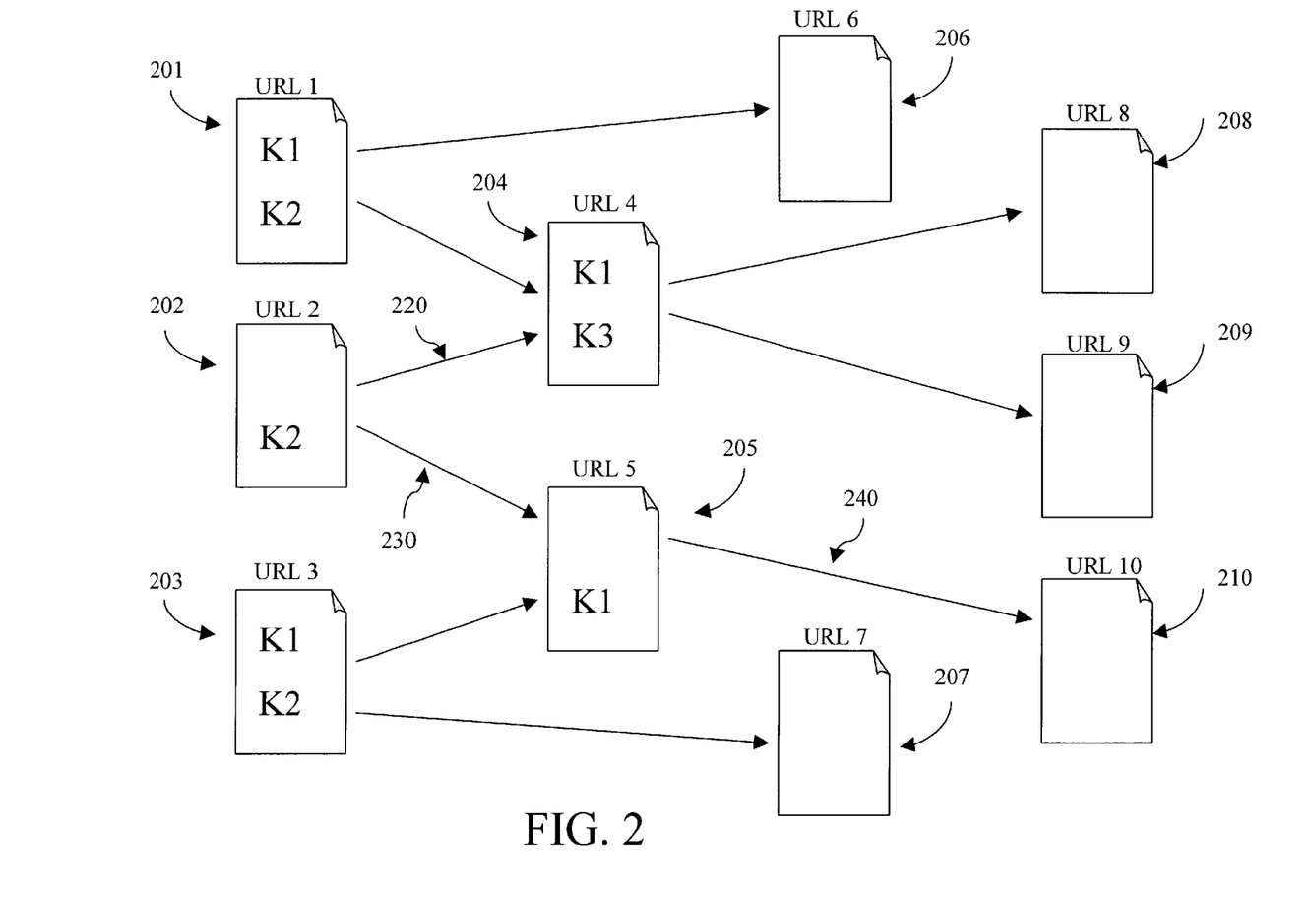
FIG. 2 shows a portion of a search space comprising physical pages, wherein each page is related to one or more other physical pages via one or more links, and wherein each page has an associated Universal Resource Locator (URL).

Also worth noting in FIG. 2, according to a preferred embodiment of the invention, each page 201–210 may have a unique URL or similar identifier associated therewith to facilitate location of the page within the search space. The Web, for example, uses a system of URLs to facilitate navigation through the search space. Each page 201–210 is shown in FIG. 2 as having a corresponding location, URL1–URL10. Importantly, the entire set of pages 201–210 may be part of the same Web site, such as the sets of pages 120 and 130 discussed above with reference to FIG. 1.

Looking more closely at FIG. 2, a simplified representation of the search space makes apparent the definition of the term "information unit." The method of the present invention identifies information units within the search space in response to a query comprising a plurality of keywords. Each keyword in the query is denoted as $K_i$, such that the query as a whole (for values of i: $1 \leq i \leq n$) can be denoted as a set of keywords as follows: $Q=\{K_1, K_2, \ldots, K_n\}$. In FIG. 2, page 204 is shown containing keywords $K_1$ and $K_3$, for example, and page 205 is shown containing only $K_1$. An information unit is defined as a set of pages selected such that each page in the information unit contains at least one of the keywords in the query, and each page in the information unit is linked, directly or indirectly, to the other pages in the information unit. By way of example, where the query is $Q=\{K_1, K_2, K_3\}$, an information unit in FIG. 2 may comprise page 202 (containing $K_2$) and page 204 (containing $K_1$ and $K_3$), but generally will not include any of pages 206 through 210 (none of which contain a keyword).

More specifically, the present invention relates to cases involving two keyword queries; that is, $Q=\{K_1, K_2\}$. Keeping the background discussion above in mind, it can be seen that FIG. 2 shows a plurality of information units which satisfy this query. In particular, both page 201 and page 203 contain both keywords in the query, $K_1$ and $K_2$. As will be discussed in more detail below, each of these pages 201 and 203, individually, is deemed a highly relevant information unit in its own right since neither relies upon the content of any other page to satisfy the query. Furthermore, page 202 may be paired with page 204 or paired with page 205 to form two additional information units. Both the combination of page 202 with page 204 via link 220 and the combination of page 202 with page 205 via link 230 result in a pair of pages which collectively contain both keywords in the query and which are directly linked.

Figure 3:
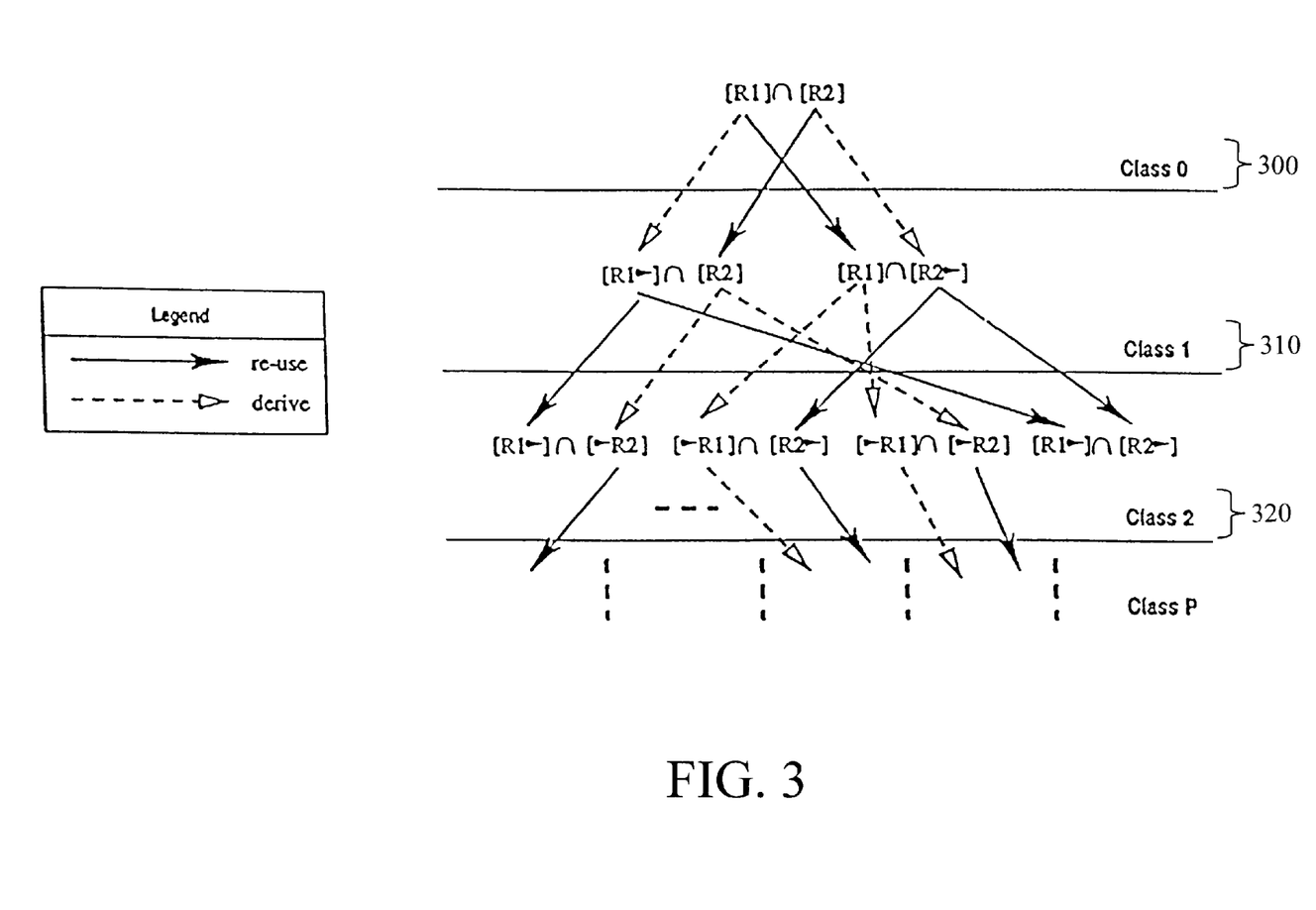
FIG. 3 shows a representation, in diagram form, of a progressive technique for processing a query consisting of two keywords.

Turning now to FIG. 3, there is shown a representation in diagram form of a progressive plan for processing a query consisting of two keywords. In the preferred embodiment illustrated in FIG. 3, the set of pages containing a given keyword, $K_i$, is denoted as $[R_i]$; i.e., $[R_i]=\kappa(K_i)$. Simply, every page in $[R_1]$ contains $K_1$ and every page in $[R_2]$ contains $K_2$. Furthermore, $[\rightarrow R_i]$ denotes a set of pages wherein each page in $[\rightarrow R_i]$ contains a link to at least one of the pages in $[R_i]$. Similarly, $[R_i \rightarrow]$ denotes a set of pages, each of which is accessible via link from at least one of the pages in $[R_i]$.

FIG. 3 illustrates the query results that are generated progressively for a query with two keywords, $K_1$ and $K_2$. Class 0 information units, shown at 300 and designated in FIG. 3 by the intersection of $[R_1]$ and $[R_2]$, are individual pages which contain both $K_1$ and $K_2$. By way of example, each of pages 201 and 203 in FIG. 2 would be identified as an independent Class 0 information unit for a two keyword query as shown in FIG. 3. Class 1 information units, shown at 310, are pairs of pages selected such that one page contains $K_1$, the other page contains $K_2$, and there is one direct link, or no intervening pages, between them. By way of example, the combination of pages 202 and 204 in FIG.

2 would be identified as a single Class 1 information unit for the two keyword query of FIG. 3; likewise, the combination of pages 202 and 205 in FIG. 2 would be identified as another Class 1 information unit. Class 2 information units, shown at 320, are pairs of pages selected such that one page contains $K_1$, the other page contains $K_2$, and there are two links, or one intervening page, between them. Similarly, Class P information units are pairs of pages selected such that one page contains $K_1$, the other page contains $K_2$, and there is a path of length P links, or P−1 intervening pages, between them.

Importantly, in the query execution process, the intermediate query results of Class 0, i.e., $[R_1]$ and $[R_2]$, are reused while processing the query for Class 1; local links associated with pages in $[R_1]$ and $[R_2]$ are explored such that $[R_1 \rightarrow]$ and $[R_2 \rightarrow]$ are derived using Class 0 results. Similarly, intermediate query results of Class 1, i.e., $[R_1 \rightarrow]$ and $[R_2 \rightarrow]$, are reused while processing the query for Class 2 as shown in the diagram of FIG. 3. Such reuse of intermediate results greatly increases the speed at which the query can be processed, and expedites the search procedure. Note that in the case of a query containing only two keywords, the computation of $([R_1 \rightarrow] \cap [R_2])$ and $([R_1] \cap [R_2 \rightarrow])$ can be parallelized.

Figure 4:
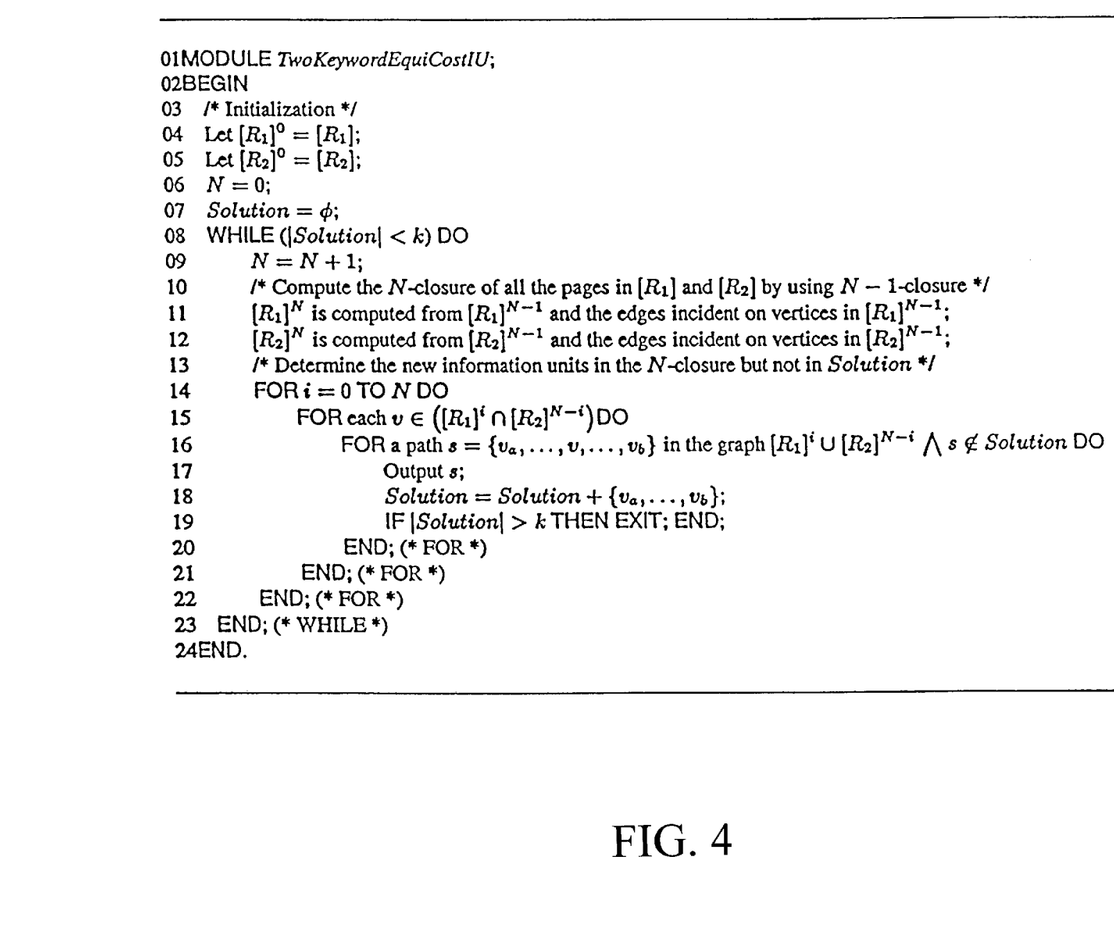
FIG. 4 shows an algorithm specifically formulated for progressive querying of a search space for information units where the query contains exactly two keywords.

FIG. 4 shows a preferred embodiment of an algorithm specifically formulated for progressive querying of a search space for information units where the query contains exactly two keywords as discussed above with respect to FIG. 3. In lines 11 and 12 of the algorithm shown in FIG. 4, the term "vertices" refers to pages in the search space, and the term "edges" refers to the links between adjacent pages. The algorithm first determines two sets of pages (denoted as $[R_1]^0$ and $[R_2]^0$ at lines 04–05 in FIG. 4), one for each keyword $K_1$ and $K_2$. Each page in the first set of pages $[R_1]^0$ contains the first keyword $K_1$ and each page in the second set of pages $[R_2]^0$ contains the second keyword $K_2$. The intersection of these two sets of pages represents Class 0 information units—pages containing both keywords $K_1$ and $K_2$. Next, the algorithm explores links associated with the pages in $[R_1]^0$ and $[R_2]^0$ as discussed above with reference to FIG. 3.

Turning now particularly to lines 11 and 12 in FIG. 4, each new set of pages, $[R_i]^N$, identified by the algorithm is determined by selecting edges, or links, associated with the pages previously identified, designated by the set $[R_i]^{N-1}$. In one preferred embodiment, each of these edges is considered to be of equal weight, or cost—note the reference to "EquiCost" in line 01 of FIG. 4. In such an embodiment, generally, the "relevance" of a given information unit is inversely proportional to the number of edges and intervening pages between the first page (containing $K_1$) in the information unit and the second page (containing $K_2$) in the information unit. The relative proximity of two pages is a fair measure of relevance in this context, since pages containing related material are often adjacent or closely linked through few intervening pages. Due to the nature of the algorithm and the order in which links searched, the most relevant information units are identified before less relevant ones, as can be appreciated by careful examination of lines 09 through 12 in FIG. 4. The fact that information units are generally identified in order of descending relevance can greatly increase the utility of the search, since the information units can be reported in the order identified.

Additionally, FIG. 4 demonstrates the iterative nature of the query processing method of the present invention. The results derived at each step in the procedure are reused in the next step. The variable "k" in FIG. 4 represents the number of information units sought by the algorithm. The "WHILE" loop (lines 08–23) is reiterated until a desired number of information units are identified.

In the above discussion, the assumption has been that a given solution to the query should contain both keywords $K_1$ and $K_2$. The present invention is adapted, however, for a relaxation of this assumption with respect to missing keywords or semantically similar words as follows.

Similarity-based Keyword Matching: In some cases, it may be acceptable for the method of the present invention to identify information units which contain words closely related to keywords in the query, though not exact matches. For example, an information unit which contains the words "web" and "symposium" may be identified as an acceptable result to a query Q={web, conference}, since "conference" and "symposium" are often used synonymously. Given a pair of keywords, the query processing method of the present invention can be adapted to identify an information unit even if one or both of the keywords are not matched precisely in a given page, but words with similar meanings are found. This method of identifying words with similar definitions is sometimes referred to as "fuzzy" keyword matching.

Word-stemming: In a special case of similarity-based keyword matching, referred to as "word-stemming" processing, it may be acceptable for the method of the present invention to identify information units which contain different forms of a given root word. For example, it may be desirable for the search engine to recognize variations which include prefixes or suffixes in addition to the root word "patent" in an issued query. In this instance, examples of relaxed words which would be recognized by the search engine in response to the query include "patents," "patented," "unpatentable," "patentability," and so forth. The present invention is capable of recognizing these and other common prefix and suffix letter combinations appended to keywords; similarity-based query processing strategies are utilized in those instances where word-stemming relaxation is desired with respect to a particular keyword in a query.

Partial Matches (Missing Keywords): In another special case of similarity-based keyword matching, the similarity between the keyword sought and the word actually located is so "fuzzy" as to render the keyword missing completely; neither synonyms nor words stemming from the keyword root are found. In some cases, it may be acceptable for the method of the present invention to identify information units which do not contain both keywords in the query. Ordinarily in such an instance, an information unit which does not contain both keywords, though acceptable, would nevertheless be less preferable than an information unit which does contain both keywords.

Keyword Importance: In some cases, one keyword may be given preference over the other keyword in the query. Since both similarity-based keyword matching and a system of assigning relative importance to individual keywords require the same sort of processing, the same strategy for processing such a query can be employed as discussed below.

Returning now to FIG. 4, there is shown the means by which the present invention is adapted to accommodate similarity-based and importance-based keyword matching. Specifically, lines 11 and 12 indicate that edges are selected at each iteration in the loop. In one preferred embodiment, each edge, or link, connecting pages in the search space can be assigned a cost depending upon the relevance of the relationship between the adjacent pages connected by the link. Such "edge costs" may be assigned to edges according to various criteria depending upon, for example, the content of the connected pages or the proximity of the pages as measured by their respective URLs. Where the search space is the Web, for example, a link connecting pages in differing physical domains may be assigned a greater cost than a link connecting pages in the same local domain. As another example, a link connecting a pair of pages wherein one page contains a keyword but the other page does not may be assigned a greater cost than a link connecting a pair of pages wherein each contains a keyword. Likewise, the edge cost assigned to an edge which is not associated with a page containing a preferred keyword may have a very high relative value which represents a "penalty" assessed due to the importance of the missing keyword.

The algorithm in FIG. 4 may be adapted such that, as each edge is selected at line 11 or 12, its assigned edge cost is indexed and recorded in a look-up table; data in such a look-up table may be selectively accessed and utilized for subsequent calculations. Each information unit may likewise be assigned a cost which is dependent upon the edge costs associated with the links connecting the pages in the information unit, and the information unit can be ranked accordingly. Thus, assigning an edge cost to each link in the search space allows the method of the present invention to identify and to rank information units in an order of relevance which is not solely dependent upon the number of links and intervening pages separating the two pages in the information unit. In this manner, the method of query processing of the present invention is able to accommodate cases wherein a keyword is missing from an information unit, word similarities are recognized, and/or one keyword is of higher importance than the other.

Often during the interactive query process, a query of the general form $Q=\{K_1, K_2, \ldots, K_n\}$ is altered responsive to the results obtained. Original queries are often reformulated slightly in order to refine, to narrow, or to broaden a given search. Three possible cases of a single change apply to any given original query Q, resulting in an altered query Q':

Q' is initiated by eliminating a term $K_i$ from Q. That is, $Q'=\{K_1, \ldots, K_{i-1}, K_{i+1}, \ldots, K_n\}$.

Q' is initiated by adding an additional term $K_{new}$ to Q. That is, $Q'=\{K_1, K_2, \ldots, K_n, K_{new}\}$.

Q' is initiated by eliminating a term $K_i$ and adding an additional term $K_{i,new}$ in Q. That is, $Q'=\{K_1, \ldots, K_{i,new}, \ldots, K_n\}$.

In a preferred embodiment involving only two keyword queries, only the third possibility is relevant, since: adding an additional keyword to the query presents a significantly more difficult problem involving more than two keywords; and, of course, eliminating a keyword reduces the altered query to a case of only one keyword. The third possibility enumerated above, however, can be handled by treating it as a combination of the elimination of a keyword followed by an addition of a keyword to the query. The result is an altered query containing exactly two keywords; that is, where $Q=\{K_1, K_2\}$, the altered query becomes $Q'=\{K_1, K_{new}\}$.

By maintaining and indexing intermediate and/or resulting solutions previously obtained across multiple queries, it is possible to expedite the processing of reformulated queries significantly. One preferred embodiment of the present invention is adapted to keep an index of each $[R_1]^N$ and each $[R_2]^N$ as determined in lines 11 and 12 of FIG. 4, such that reformulated queries can be processed without recalculation of these sets of pages.

The method of the present invention is easily implemented by a computer-based system. Such a system embodying the method of the present invention comprises means for receiving a query input and means, responsive to the query input, for identifying at least one information unit which satisfies the query, either in its original, altered, or relaxed form. Typical means for receiving a query input include a programmed computer application including a user interface, such as a graphical user interface, operable for accepting alpha-numeric character input as well as other input common in graphical user interface models, such as user-selectable check-boxes, radio buttons, and the like. Means for identifying at least one information unit in this embodiment include the method of the present invention as discussed above with reference to FIGS. 2–4. These means for receiving a query input and means for identifying at least one information unit may be integrated as subroutines into a single computer program, or they may be separately programmed applications designed to perform in cooperation.

Figure 5:
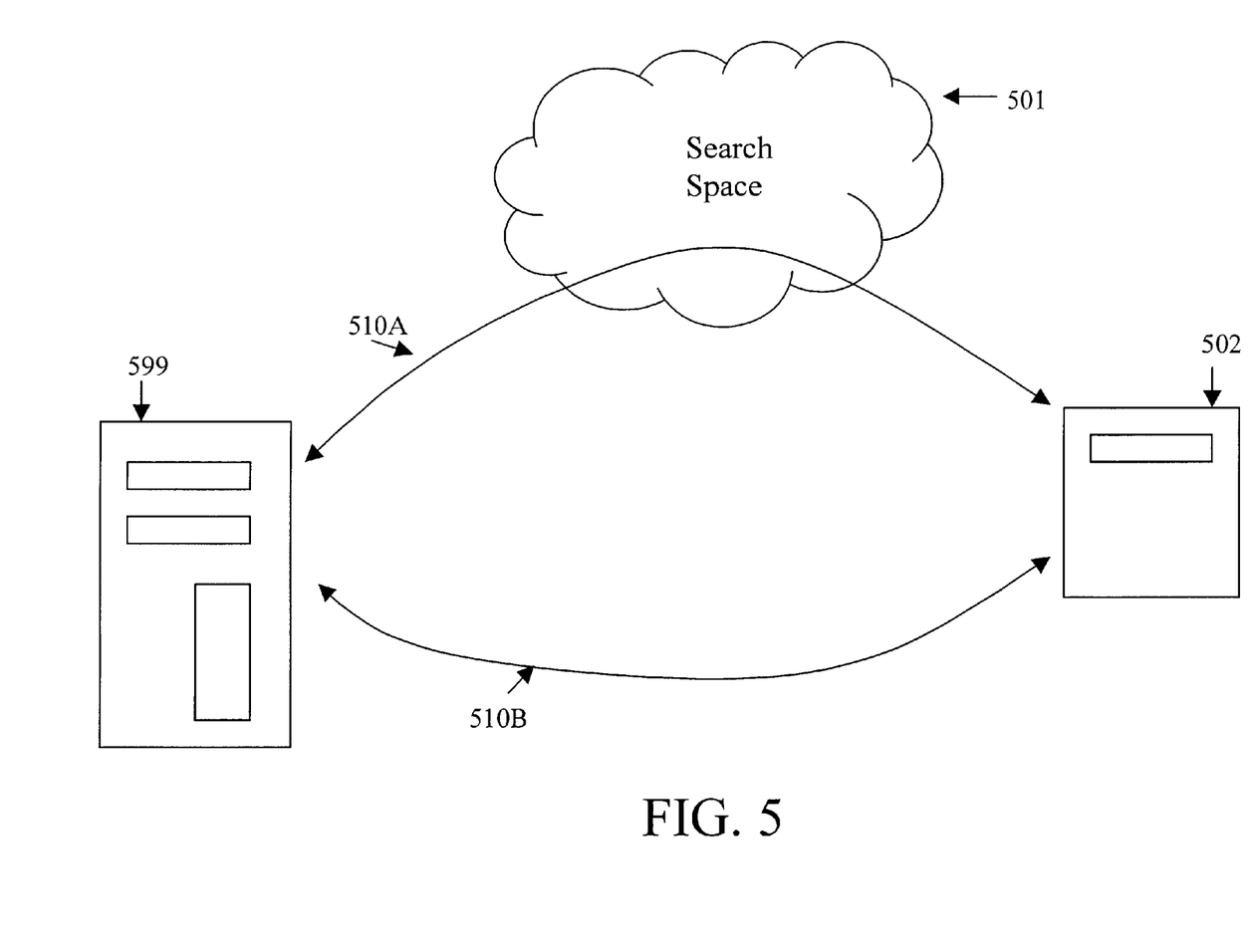
FIG. 5 shows the operation of a computer-based system implementing the method of document retrieval of the present invention.

FIG. 5 illustrates the operation of a computer-based system of the present invention. The system is represented by the programmed computer 599, which is typically implemented in a file server or internet server capacity. The search space, represented at 501, may be, for example, the World Wide Web or an XML database. A user at a remote terminal 502, such as a work-station or personal computer, generally has access to the processing capabilities of system 599 through a network connection which may or may not pass through the search space, denoted as 510A and 510B, respectively.

Responsive to a query input, which may be received, for example, via network connections 510A, 510B, system 599 implements procedures for identifying at least one information unit. Such procedures include investigating the pages within the search space 501 as described with respect to the method above and may incorporate a query processing strategy as shown in FIG. 3 and a progressive query processing algorithm as shown in FIG. 4. System 599 may also include programmed processing procedures adapted for reporting the results of the query, for example, via network connections 510A, 510B.

From the foregoing, it can be seen that the method of the present invention provides a versatile and thorough query processing technique which addresses the structure and arrangement of the search space. The preferred embodiments disclosed have been described and illustrated by way of example only, and not by way of limitation. Other modifications and variations to the invention will be apparent to those skilled in the art from the foregoing detailed disclosure and teachings. Thus, while only certain embodiments of the invention have been specifically described herein, it will be apparent that numerous modifications may be made thereto without departing from the spirit and scope of the invention.

What is claimed is:

1. A method of identifying an information unit in response to a query of a search space, the search space comprising a plurality of pages; said method comprising:

(a) responsive to a query comprising a plurality of keywords, determining a set of pages within the search space wherein each page in said set of pages contains at least one of said plurality of keywords; and (b) identifying at least one information unit comprising one or more pages selected from said set of pages such that each page in said information unit contains at least one of said plurality of keywords; every page in said information unit being linked, directly or indirectly, to every other page in said information unit.

2. The method according to claim 1 wherein said one or more pages in said at least one information unit collectively contain all of said plurality of keywords.

3. The method according to claim 1 further comprising: reporting said at least one information unit to a user.

4. The method according to claim 1 wherein, responsive to a request for relaxed query processing, said identifying at least one information unit is performed such that said information unit comprises a page which does not contain at least one of said plurality of keywords.

5. The method according to claim 1 further comprising:
(c) reporting said at least one information unit to a user or, in the alternative, reporting that an information unit which satisfies the query cannot be found; and
(d) responsive to an altered query provided as a result of said reporting, repeating (a) through (c) for said altered query.

6. The method according to claim 5 wherein said altered query is a query with one keyword added to said plurality of keywords and one keyword eliminated from said plurality of keywords.

7. The method according to claim 6 wherein, responsive to a request for relaxed query processing, said identifying at least one information unit is performed such that said information unit comprises a page which does not contain said one keyword added to said plurality of keywords.

8. The method according to claim 1 wherein said identifying at least one information unit comprises identifying a plurality of information units.

9. The method according to claim 1 wherein the search space is the World Wide Web.

10. The method according to claim 1 wherein the search space is an XML database.

11. The method according to claim 1 wherein said plurality of keywords is greater than two.

12. The method according to claim 1 wherein said plurality of keywords is two.

13. The method according to claim 12 wherein said identifying at least one information unit comprises:
(i) determining, from said set of pages, a first set of pages wherein each page in said first set of pages contains the first of said plurality of keywords, and a second set of pages wherein each page in said second set of pages contains the second of said plurality of keywords; and
(ii) identifying an intersection of said first set of pages and said second set of pages such that each page within said intersection contains both of said plurality of keywords; each said page within said intersection being a separate information unit.

14. The method according to claim 13 wherein said identifying at least one information unit further comprises:
(iii) selecting links associated with said pages contained in said first set of pages and said second set of pages to identify a plurality of pairs of pages; each of said plurality of pairs of pages containing two pages which are related such that a first page contains the first of said plurality of keywords and a second page contains the second of said plurality of keywords and said first page and said second page are linked directly by exactly one link; each of said plurality of pairs of pages being a separate information unit; each page associated with a selected link which does not contain either of said plurality of keywords being an intervening page.

15. The method according to claim 14 wherein said identifying at least one information unit further comprises:

(iv) selecting links associated with said pages contained in said first set of pages and said second set of pages and links associated with each said intervening page to identify additional pairs of pages; each of said additional pairs of pages containing two pages which are related such that a first additional page contains the first of said plurality of keywords and a second additional page contains the second of said plurality of keywords and said first additional page and said second additional page are linked indirectly by more than one link through at least one of said intervening pages; each said additional pair of pages being a separate information unit.

16. The method according to claim 15 wherein said identifying at least one information unit further comprises:
(v) repeating said selecting links associated with said pages contained in said first set of pages and said second set of pages and links associated with each said intervening page to identify further additional information units which contain remote pairs of pages; each of said remote pairs of pages containing two pages which are related such that a first remote page contains the first of said plurality of keywords and a second remote page contains the second of said plurality of keywords and said first remote page and said second remote page are separated by more than one intervening page; each said remote pair of pages being a separate information unit.

17. The method according to claim 14 wherein each said link is assigned a link cost.

18. The method according to claim 17 wherein each said information unit is assigned a cost based upon said link cost assigned to each said link associated with said pages in each said information unit.

19. The method according to claim 18 wherein said selecting links associated with said pages contained in said first set of pages and said second set of pages is based upon said link cost assigned to each said link such that a plurality of information units are identified in order of increasing cost; said method further comprising:
reporting said plurality of identified information units in order of increasing cost.

20. The method according to claim 12 wherein the search space is the World Wide Web, the pages in said first and second sets of pages are pages on the World Wide Web, and the links between said pages are hyperlinks.

21. The method according to claim 12 wherein the search space is an XML database, the pages in said first and second sets of pages are data records in the XML database, and the links between said data records are dynamic links.

22. A method of identifying and reporting an information unit in response to a query of a search space, the search space comprising a plurality of pages; said method comprising:
(a) responsive to a query comprising a plurality of keywords, determining a set of pages within the search space wherein each page in said set of pages contains at least one of said plurality of keywords;
(b) identifying at least one information unit comprising one or more pages selected from said set of pages such that each page in said information unit contains at least one of said plurality of keywords; every page in said information unit being linked, directly or indirectly, to every other page in said information unit;
(c) reporting said at least one information unit to a user or, in the alternative, reporting that an information unit which satisfies the query cannot be found; and (d) responsive to an altered query provided as a result of said reporting, repeating (a) through (c) for said altered query.

23. The method according to claim 22 wherein said one or more pages in said information unit collectively contain all of said plurality of keywords.

24. The method according to claim 22 wherein said identifying at least one information unit comprises identifying a plurality of information units.

25. The method according to claim 22 wherein the search space is the World Wide Web.

26. The method according to claim 22 wherein the search space is an XML database.

27. The method according to claim 22 wherein, responsive to a request for relaxed query processing, said identifying at least one information unit is performed such that said information unit comprises a page which does not contain at least one of said plurality of keywords.

28. The method according to claim 22 wherein said altered query is a query with one keyword added to said plurality of keywords and one keyword eliminated from said plurality of keywords.

29. The method according to claim 28 wherein, responsive to a request for relaxed query processing, said identifying at least one information unit is performed such that said information unit comprises a page which does not contain at least one of said plurality of keywords.

30. The method according to claim 22 wherein said plurality of keywords is greater than two.

31. The method according to claim 22 wherein said plurality of keywords is two.

32. The method according to claim 31 wherein said identifying at least one information unit comprises:

(i) determining, from said set of pages, a first set of pages wherein each page in said first set of pages contains the first of said plurality of keywords, and a second set of pages wherein each page in said second set of pages contains the second of said plurality of keywords; and (ii) identifying an intersection of said first set of pages and said second set of pages such that each page within said intersection contains both of said plurality of keywords; each said page within said intersection being a separate information unit.

33. The method according to claim 32 wherein said identifying at least one information unit further comprises:

(iii) selecting links associated with said pages contained in said first set of pages and said second set of pages to identify a plurality of pairs of pages;

each of said plurality of pairs of pages containing two pages which are related such that a first page contains the first of said plurality of keywords and a second page contains the second of said plurality of keywords and said first page and said second page are linked directly by exactly one link; each of said plurality of pairs of pages being a separate information unit; each page associated with a selected link which does not contain either of said plurality of keywords being an intervening page.

34. The method according to claim 33 wherein said identifying at least one information unit further comprises:

(iv) selecting links associated with said pages contained in said first set of pages and said second set of pages and links associated with each said intervening page to identify additional pairs of pages; each of said additional pairs of pages containing two pages which are related such that a first additional page contains the first of said plurality of keywords and a second additional page contains the second of said plurality of keywords and said first additional page and said second additional page are linked indirectly by more than one link through at least one of said intervening pages; each said additional pair of pages being a separate information unit.

35. The method according to claim 34 wherein said identifying at least one information unit further comprises:

(v) repeating said selecting links associated with said pages contained in said first set of pages and said second set of pages and links associated with each said intervening page to identify further additional information units which contain remote pairs of pages; each of said remote pairs of pages containing two pages which are related such that a first remote page contains the first of said plurality of keywords and a second remote page contains the second of said plurality of keywords and said first remote page and said second remote page are separated by more than one intervening page; each said remote pair of pages being a separate information unit.

36. The method according to claim 33 wherein each said link is assigned a link cost.

37. The method according to claim 36 wherein each said information unit is assigned a cost based upon said link cost assigned to each said link associated with said pages in each said information unit.

38. The method according to claim 31 wherein the search space is the World Wide Web, the pages in said first and second sets of pages are pages on the World Wide Web, and the links between said pages are hyperlinks.

39. The method according to claim 31 wherein the search space is an XML database, the pages in said first and second sets of pages are data records in the XML database, and the links between said data records are dynamic links.

40. The method according to claim 37 wherein said selecting links associated with said pages contained in said first set of pages and said second set of pages is based upon said link cost assigned to each said link such that a plurality of information units are identified in order of increasing cost; said method further comprising:

reporting said plurality of identified information units in order of increasing cost.

41. A computer-based system for identifying and reporting an information unit in response to a query of a search space, the search space comprising a plurality of pages; said system comprising:

means for receiving a query input; said query input comprising a plurality of keywords; and means, responsive to said query input, for identifying at least one information unit; said at least one information unit comprising one or more pages within the search space selected such that each page in said information unit contains at least one of said plurality of keywords; every page in said information unit being linked, directly or indirectly, to every other page in said information unit.

42. The computer-based system according to claim 41 further comprising:

means for reporting said at least one information unit to a user or, in the alternative, reporting that an information unit which satisfies the query cannot be found.

43. The computer-based system according to claim 41 further comprising:

means for receiving an altered query input.

44. The computer-based system according to claim 41 further comprising:

means for receiving a relaxed query processing input; and means, responsive to said relaxed query processing input, for identifying at least one information unit comprising a page which does not contain at least one of said plurality of keywords.

45. The computer-based system according to claim 41 further comprising:

means for ranking said at least one information unit such that, if a plurality of information units are identified, said plurality of information units are ranked in order; and means for reporting said plurality of identified information units in rank order.

* * * * *